(12) United States Patent
Eichenauer

(10) Patent No.: US 6,489,379 B1
(45) Date of Patent: Dec. 3, 2002

(54) THERMOPLASTIC MOLDING MATERIALS BASED ON HIGHLY EFFECTIVE GRAFTED RUBBER COMPONENTS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/743,232

(22) PCT Filed: Jul. 5, 1999

(86) PCT No.: PCT/EP99/04651

§ 371 (c)(1),
(2), (4) Date: Jan. 8, 2001

(87) PCT Pub. No.: WO00/04067

PCT Pub. Date: Jan. 27, 2000

(30) Foreign Application Priority Data

Jul. 15, 1998 (DE) .......................................... 198 31 735

(51) Int. Cl.$^7$ ........................ C08F 279/00; C08F 285/00
(52) U.S. Cl. ........................ 523/201; 525/63; 525/66; 525/67; 525/71; 525/193

(58) Field of Search .............................. 523/201; 525/66, 525/67, 63, 193, 71

(56) References Cited

U.S. PATENT DOCUMENTS

| | | |
|---|---|---|
| 3,542,905 A | 11/1970 | Nishioka et al. |
| 4,652,614 A | 3/1987 | Eichenauer et al. ........... 525/71 |
| 5,298,563 A | 3/1994 | Ishiga et al. ................. 525/245 |
| 5,668,218 A | 9/1997 | Eichenauer et al. ......... 525/265 |
| 5,723,540 A | 3/1998 | Eichenauer et al. .......... 525/78 |

FOREIGN PATENT DOCUMENTS

| | | |
|---|---|---|
| EP | 0 051 336 | 5/1982 |
| EP | 0 678 531 | 10/1995 |
| GB | 1255797 | 12/1971 |

*Primary Examiner*—Jeffrey Mullis
(74) *Attorney, Agent, or Firm*—Joseph C. Gil; Aron Preis; James R. Franks

(57) ABSTRACT

The invention provides thermoplastic molding compositions of the ABS type containing highly effective graft rubber components obtained by emulsion polymerization while using a special initiator system and maintaining defined reaction conditions.

14 Claims, No Drawings

THERMOPLASTIC MOLDING MATERIALS BASED ON HIGHLY EFFECTIVE GRAFTED RUBBER COMPONENTS

The invention provides thermoplastic moulding compositions of the ABS type containing highly effective graft rubber components obtained by emulsion polymerisation while using special initiator systems and observing defined reaction conditions.

Moulding compositions of the ABS type are two-phase plastics materials consisting of I) a thermoplastic copolymer of styrene and acrylonitrile in which the styrene can be replaced completely or partially by α-methyl styrene or methyl methacrylate; this copolymer, also known as SAN resin or matrix resin, forms the external phase;

II) at least one graft polymer produced by graft reaction of one or more of the monomers mentioned under I on butadiene—homo—or copolymer ("graft base"). This graft polymer ("elastomer phase" or "graft rubber") forms the dispersed phase in the matrix resin.

With an identical matrix, the viscosity of an ABS moulding composition is determined substantially by the graft rubber. However, the viscosity required for markedly stressed mouldings cannot always be achieved with the necessary reliability using conventional ABS moulding compositions, particularly if very high viscosities are demanded at low temperatures or if these requirements are met only at the cost of other properties also required, for example rigidity or processing behaviour.

There is therefore a need for graft rubbers on the basis of which ABS moulding compositions with very high viscosities at room temperature and at low temperature can be produced without impairing the other properties, in particular rigidity and processibility.

Furthermore, it should also be possible to produce these graft rubbers on the basis of more finely divided rubber bases so that mouldings with high surface lustre can also be obtained if necessary.

It has accordingly been found that moulding compositions of the ABS type with excellent viscosities at room temperature and low temperature are obtained without adversely affecting the other properties if the graft rubber employed is produced while using special combinations of initiator systems and while maintaining defined reaction conditions.

The production of graft rubbers using various initiator systems is known. Thus, numerous documents, for example EP-A 154 244, describe the use of potassium persulfate as initiator. Documents such as, for example, EP-A 745 623 (see also the literature quoted therein) describe the use of special redox systems or of azo initiators. Although initiator systems of this type lead to graft polymers which lead to good properties in thermoplastic moulding compositions for special requirements, good viscosities at high and low temperatures are not achieved to the adequate extent while maintaining the other properties.

The invention provides thermoplastic moulding compositions of the ABS type containing A) at least one elastic/thermoplastic graft polymer obtained by radical emulsion polymerisation of resin-forming vinyl monomers, preferably of styrene or acrylonitrile, wherein styrene and/or acrylonitrile can be completely or partially replaced by α-methyl styrene, methyl methacrylate or N-phenylmaleimide, in the presence of rubber existing in latex form with a glass transition temperature ≦0° using an initiator combination consisting of a redox initiator system and a persulfate compound and B) at least one copolymer of styrene and acrylonitrile, wherein styrene and/or acrylonitrile can be completely or partially replaced by α-methyl styrene or methyl methacrylate or N-phenylmaleimide, characterised in that the graft polymer A) is produced by supplying the monomers to the rubber latex, the redox initiator components are added at the beginning of the graft polymerisation reaction in quantities of 0.1 to 2.5 wt. %, preferably of 0.2 to 2.0 wt. % and particularly preferably of 0.5 to 1.5 wt. % (based on the monomers added up to the moment of addition of persulfate compound in each case), a persulfate compound is added after an addition of monomers of 10 to 95 wt. %, preferably 20 to 85 wt. %, in particular 20 to 80 wt. % particularly preferably 30 to 75 wt. % and quite particularly preferably 35 to 70 wt. % (based on total quantity of monomer in each case), in quantities of 0.05 to 1.5 wt. %, preferably of 0.08 to 1.2 wt. % and particularly preferably of 0.1 to 1.0 wt. % (based on the monomers added from the moment of addition of persulfate compound in each case) and polymerisation is carried out until completion.

In principle, any rubber-like polymers existing in the form of an emulsion with a glass transition temperature lower than 0° C. are suitable as rubbers for producing the elastic/thermoplastic graft polymers according to the invention.

Examples of suitable polymers include diene rubbers, i.e. homopolymers of conjugate dienes containing 4 to 8 carbon atoms such as butadiene, isoprene, chloroprene or copolymers thereof with up to 60 wt. %, preferably up to 30 wt. % of a vinyl monomer, for example acrylonitrile, methacrylonitrile, styrene, α-methyl styrene, halogen styrenes, $C_1$–$C_4$ alkyl styrenes, $C_1$–$C_8$ alkyl acrylates, $C_1$–$C_8$ alkyl methacrylates, alkyleneglycol diacrylates, alkyleneglycol dimethacrylates, divinyl benzene;

acrylate rubbers, i.e. homo- and copolymers of $C_1$–$C_{10}$ alkyl acrylates, for example homopolymers of ethyl acrylate, butyl acrylate or copolymers containing up to 40 wt. %, preferably not more than 10 wt. % of monovinyl monomers, for example styrene, acrylonitrile, vinylbutylether, acrylic acid (ester), methacrylic acid (ester), vinyl sulfonic acid. It is preferable to use acrylate rubber homo- or copolymers which contain from 0.01 to 8 wt. % of divinyl or polyvinyl compounds and/or N-methylolacrylamide or N-methylolmethacrylamide or other compounds acting as crosslinking agents, for example divinylbenzene, triallylcyanurate.

Polybutadiene rubbers, SBR rubbers with up to 30 wt. % of styrene incorporated by polymerisation and acrylate rubbers, in particular those having a core/shell structure, for example as described in DE-OS 3 006 804, are preferred.

Latices having average particle diameters $d_{50}$ of 0.05 to 2.0 μm, preferably of 0.08 to 1.0 μm and particularly preferably of 0.1 to 0.5 μm can be used for producing the graft polymers according to the invention. The gel contents of the rubbers used can be varied in wide limits and preferably lie between 30 and 95 wt. % (determined by the wire cage method in toluene (cf. Houben-Weyl, Methoden der Organischen Chemie, Makromolekulare Stoffe, part 1, page 307 (1961) Thieme Verlag Stuttgart)).

Quite particularly preferred are mixtures of rubber latices having a) average particle diameters $d_{50}$≦320 nm, preferably 260 to 310 nm, and gel contents ≦70 wt. %, preferably 40 to 65 wt. % and b) average particle diameters $d_{50}$≧370 nm, preferably 380 to 450 nm, and gel contents ≦70 wt. %, preferably 75 to 90 wt. %.

The rubber latex (a) preferably has a particle size distribution range of 30 to 100 nm, particularly preferably of 40 to 80 nm, and the rubber latex (b) of 50 to 500 nm, particularly preferably of 100 to 400 nm (measured as $d_{90}$-$d_{10}$ value from the integral particle size distribution in each case).

The mixtures contain the rubber latices (a) and (b) preferably in a ratio by weight of 90:10 to 10:90, particularly preferably 60:40 to 30:70 (based on the respective solids content of the latices in each case).

The average particle diameters are determined by ultracentrifuge (cf. W. Scholtan, H. Lange: Kolloid-Z. u Z. Polymere 250, pages 782 to 796 (1972).

The values given for the gel content are determined by the wire cage method in toluene (cf. Houben-Weyl, Methoden der Organischen Chemie, Makromolekulare Stoffe, part 1, page 307 (1961) Thieme Verlag Stuttgart).

The rubber latices used can be produced by emulsion polymerisation and the necessary reaction conditions, auxiliaries and production techniques are basically known.

It is also possible initially to produce a finely divided rubber polymer by known methods and then to agglomerate it in a known manner to adjust the necessary particle size. Appropriate techniques are described (cf. EP-PS 0 029 613; EP-PS 0 007 810; DD-PS 144 415; DE-AS 12 33 131; DE-AS 12 58 076; DE-OS 21 01 650; U.S. Pat, No. 1,379,391).

The so-called seed polymerisation technique can also be employed, during which, for example, a finely divided butadiene polymer is initially produced and is then repolymerised to larger particles by subsequent reaction with butadiene-containing monomers.

Conventional anionic emulsifiers such as alkyl sulfates, alkyl sulfonates, aralkyl sulfonates, soaps of saturated or unsaturated fatty acids (for example oleic acid, stearic acid) as well as alkaline disproportionated or hydrogenated abietic acid or talloleic acid can be used as emulsifiers, emulsifiers containing a carboxyl group (for example salts of $C_{10}$–$C_{18}$ fatty acids, disproportionated abietic acid) preferably being used.

Rubber polymer latices can basically also be produced by emulsification of finished rubber polymers in aqueous media (cf. Japanese patent application 55 125 102).

Graft monomers which are polymerised in the presence of the rubber-like polymers existing in the form of an emulsion include virtually all compounds which can be polymerised in an emulsion to thermoplastic resins, for example vinyl aromatic substances corresponding to formula (I) or compounds corresponding to formula (II) or mixtures thereof

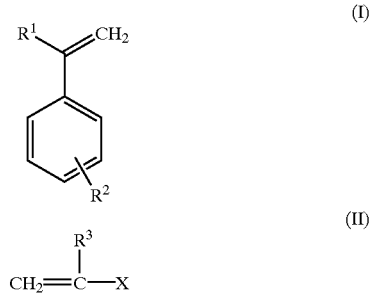

in which $R^1$ represents hydrogen or methyl, $R^2$ represents hydrogen, halogen or alkyl containing 1 to 4 carbon atoms in the ortho-, meta- or para-position, $R^3$ represents hydrogen or methyl and X represents CN, $R^4$OOC or $R^5R^6$NOC, wherein $R^4$ represents hydrogen or alkyl containing 1 to 4 carbon atoms; and $R^5$ and $R^6$ independently represent hydrogen, phenyl or alkyl containing 1 to 4 carbon atoms.

Examples of compounds corresponding to formula (I) include styrene, α-methyl styrene, p-methyl styrene and vinyltoluene. Compounds corresponding to formula (II) include acrylonitrile and methyl methacrylate. Further monomers which are basically suitable include for example, vinyl acetate and N-phenylmaleimide.

Preferred monomers are mixtures of styrene and acrylonitrile, α-methyl styrene and acrylonitrile, of styrene, acrylonitrile and methyl methacrylate as well as combinations of these monomer mixtures with N-phenylmaleimide.

Preferred graft polymers A) according to the invention are those obtained by graft polymerisation of styrene and acrylonitrile in a ratio by weight of 90:10 to 50:50, preferably 80:20 to 65:35 (wherein styrene can be completely or partially replaced by α-methyl styrene or methyl methacrylate) in the presence of quantities of rubber, preferably polybutadiene, which are sufficient to produce graft polymers having rubber contents of 20 to 80 wt. %, preferably 30 to 75 wt. % and particularly preferably 35 to 70 wt. %.

The graft polymers A) are produced according to the invention in that a redox initiator system is added to the rubber latex or the rubber latex mixture at the beginning of the grafting reaction.

Suitable redox initiator systems generally consist of an organic oxidising agent and a reducing agent, heavy metal ions preferably additionally being present in the reaction medium.

Organic oxidising agents which are suitable according to the invention include, for example, di-tert.-butylperoxide, cumene hydroperoxide, dicyclohexylpercarbonate, tert.-butylhydroperoxide, p-methane hydroperoxide, cumene hydroperoxide and tert.-butylhydroperoxide being preferred. $H_2O_2$ can basically also be used.

Reducing agents which can be used according to the invention are preferably water-soluble compounds, for example salts of sulfinic acid, salts of sulfuric acid, sodium dithionite, sodium sulfite, sodium hyposulfite, sodium hydrogen sulfite, ascorbic acid and salts thereof, Rongalite C (sodium formaldehyde sulfoxylate), mono- and dihydroxyacetone, sugar (for example glucose or dextrose), iron(II) salts, such as, for example iron(II) sulfate, tin(II) salts, such as, for example tin(II) chloride, titanium(III) salts such as titanium(III) sulfate.

Preferred reducing agents include water-soluble compounds, for example dextrose, ascorbic acid (salts) or sodium formaldehyde sulfoxylate (Rongalite C).

The quantities of oxidising agent used are from 0.05 to 2.0 wt. %, preferably 0.1 to 1.5 wt. % and particularly preferably 0.2 to 1.2 wt. %. Reducing agents are used in quantities of 0.05 to 1.5 wt. %, preferably of 0.08 to 1.2 wt. % and particularly preferably of 0.1 to 1.0 wt. % (based on the monomers added up to the moment of addition of persulfate compound in each case).

The graft monomers are subsequently added and, after a quantity of 10 to 95 wt. %, preferably 20 to 85 wt. %, particularly preferably 20 to 80 wt. %, in particular 30 to 75 wt. % and quite particularly preferably 35 to 70 wt. % has been added (based on total quantity of monomers in each case), at least one persulfate compound is added in quantities of 0.05 to 1.5 wt. %, preferably 0.08 to 1.2 wt. % and particularly preferably 0.1 to. 1.0 wt. % (based on the monomers added from the beginning of addition of persulfate compound in each case).

Suitable persulfate compounds include, for example, sodium peroxodisulfate, potassium peroxodisulfate, ammonium peroxodisulfate, potassium peroxodisulfate being the preferred persulfate compound.

The redox initiator components as well as the persulfate compound are conventionally used in the form of aqueous solutions, aqueous emulsions, aqueous suspensions or other aqueous dispersions. The remaining monomers are then added and completely polymerised.

The invention also provides a process for producing graft rubbers by emulsion polymerisation using a combination of initiators consisting of a redox initiator system and a persulfate compound, wherein i) the graft monomers are added to the rubber latex,
ii) the redox initiator components are added in quantities of 0.1 to 2.5 wt. % (based on the monomers added up to the moment of addition of persulfate compound) at the beginning of the graft polymerisation reaction,
iii) a persulfate compound is added in quantities of 0.05 to 1.5 wt. % (based on the monomers added from the moment of addition of the persulfate compound) after a monomer addition of 10 to 95 wt. % (based on total quantity of monomers) and
iv) the polymerisation reaction is completed.

The reaction temperature during production of the graft rubbers A) according to the invention can be varied within wide limits. It is from 25° C. to 160° C., preferably 40° C. to 90° C. The temperature at the beginning of monomer addition quite particularly preferably differs from the temperature at the end of monomer addition by a maximum of 20° C., preferably a maximum of 10° C. and particularly preferably a maximum of 5° C.

Molecular weight regulators can additionally be used during graft polymerisation, preferably in quantities of 0.05 to 2 wt. %, particularly preferably in quantities of 0.1 to 1 wt. % (based on total quantity of monomer in each case).

A procedure which is preferred according to the invention involves the addition of molecular weight regulators only in the portion of the reaction after addition of the persulfate compound and the avoidance of regulator addition in the portion of the reaction prior to addition of the persulfate compound.

Suitable molecular weight regulators include, for example, n-dodecylmercaptan, t-dodecylmercaptan, dimeric α-methyl styrene, terpinolene and combinations of mixtures of these compounds.

The above-mentioned compounds can be used as emulsifiers during the graft polymerisation reaction.

The graft rubber latex A) is worked up by known processes, for example by spray drying or by addition of salts and/acids, washing of the precipitates and drying of the powder.

Copolymers of styrene and acrylonitrile are preferably used as vinyl resins B) in a proportion by weight of 90:10 to 50:50, wherein styrene and/or acrylonitrile can be completely or partially replaced by α-methyl styrene and/or methyl methacrylate; a proportion of up to 30 wt. % (based on vinyl resin) of a further monomer from the range comprising maleic anhydride, maleimide, N-(cyclo) alkylmaleimide, N-(alkyl)-phenylmaleimide can optionally also be used.

The average molecular weights ($\overline{M}_w$) of these resins can be varied in wide limits and they preferably lie between about 40,000 and 200,000, particularly preferably between 50,000 and 150,000.

Details concerning the production of these resins are provided, for example, in DE-AS 2 420 358 and DE-AS 2 724 360. Resins produced by mass and solution polymerisation and by suspension polymerisation have proven particularly suitable.

The proportion of the elastic/thermoplastic graft polymer (A) in the moulding composition according to the invention can be varied in wide limits; it is preferably 10 to 80 wt. %, particularly preferably 20 to 75 wt. %.

The necessary or advantageous additives, for example antioxidants, UV stabilisers, peroxide destroyers, antistatic agents, lubricants, mould release agents, flameproofing agents, fillers or reinforcing agents (glass fibres, carbon fibres, etc.) and colourants can be added to the moulding compositions according to the invention during production, working up, further processing and final shaping.

Final shaping can be carried out on conventional commercial processing units and involves, for example, injection moulding, sheet extrusion optionally with subsequent thermal shaping, cold shaping, extrusion of pipes and profiles or calendering.

The moulding compositions according to the invention of the ABS type can be blended with other polymers. Suitable blending partners are selected, for example, from at least one polymer selected from the group comprising polycarbonates, polyesters, polyester carbonates and polyamides.

Suitable thermoplastic polycarbonates and polyester carbonates are known (cf., for example, DE-AS 1 495 626, DE-OS 2 232 877, DE-OS 2 703 376, DE-OS 2 714 544, DE-OS 3 000 610, DE-OS 3 832 396, DE-OS 3 077 934), for example can be produced by reaction of diphenols corresponding to the formulae (III) and (IV)

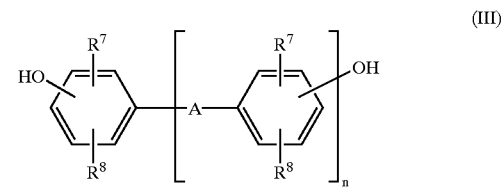

(III)

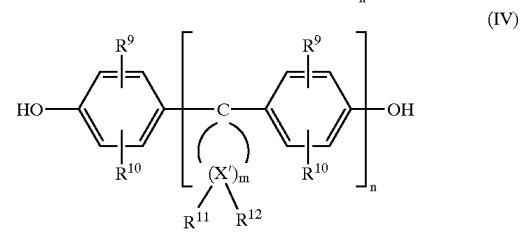

(IV)

wherein
A is a simple bond, $C_1$–$C_5$ alkylene, $C_2$–$C_5$ alkylidene, $C_5$–$C_6$ cycloalkylidene, —O—, —S—, —SO—, —$SO_2$— or —CO—,
$R^7$ and $R^8$ independently represent hydrogen, methyl or halogen, in particular hydrogen, methyl, chlorine or bromine,
$R^9$ and $R^{10}$ independently represent hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$ alkyl, in particular benzyl,
m is an integer from 4 to 7, preferably 4 or 5,
n is 0 or 1,
$R^{11}$ and $R^{12}$ can be selected individually for each X and independently represent hydrogen or $C_1$–$C_6$ alkyl and X' represents carbon,
with carbonyl halides, preferably phosgene, and/or with aromatic dicarboxylic acid dihalides, preferably benzene dicarboxylic acid dihalides, by phase interface polycondensation or with phosgene by polycondensation in the homogeneous phase (the so-called pyridine process), wherein the molecular weight can be adjusted in a known manner by an appropriate quantity of known chain terminators.

Suitable diphenols corresponding to formulae (III) and (IV) include, for example, hydroquninone, resorcinol, 4,4'-dihydroxydiphenyl, 2,2,-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclo-hexane or 1,1 -bis-(4-hydroxyphenyl)-2,4,4,-trimethylcyclopentane.

2,2-bis-(4-hydroxyphenyl)-propane and 1,1-bis-(4-hydroxyphenyl)-cyclohexane are preferred diphenols corresponding to formula (III) and 1,1-bis-(4-hydroxyphenyl)-3,3,5-trimethylcyclohexane is the preferred phenol corresponding to formula (IV).

Mixtures of diphenols can also be used.

Suitable chain terminators include, for example, phenol, p-tert.-butyl phenol, long-chained alkyl phenols such as 4-(1,3-tetramethyl-butyl)phenol according to DE-OS 2 842 005, monoalkyl phenols, dialkyl phenols with a total of 8 to 20 carbon atoms in the alkyl substituents according to DE-OS 3 506 472 such as p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The quantity of chain terminators required is generally from 0.5 to 10 mole %, based on the sum of diphenols (I) and (II).

Suitable polycarbonates and polyester carbonates can be linear or branched; branched products are preferably obtained by incorporating from 0.05 to 2.0 mole %, based on the sum of diphenols used, of trifunctional or higher than trifunctional compounds, for example those with three or more than three phenolic OH groups.

Suitable polycarbonates and polyester carbonates can contain aromatically bound halogen, preferably bromine and/or chlorine; they are preferably halogen-free.

They have average molecular weights ($\overline{M}_w$, weight average) determined, for example, by ultracentrifugation or scattered light measurement of 10,000 to 200,000, preferably 20,000 to 80,000.

Suitable thermoplastic polyesters are preferably polyalkylene terephthalates, i.e. reaction products of aromatic dicarboxylic acids or reactive derivatives thereof (for example dimethylesters or anhydrides) and aliphatic, cycloaliphatic or arylaliphatic diols and mixtures of these reaction products.

Preferred polyalkylene terephthalates can be produced from terephthalic acids (or reactive derivatives thereof) and aliphatic or cycloaliphatic diols containing 2 to 10 carbon atoms by known methods (Kunststoff-Handbuch, Volume VIII, page 695 et seq., Carl Hanser Verlag, Munich 1973).

In preferred polyalkylene terephthalates, 80 to 100, preferably 90 to 100 mole % of the dicarboxylic acid radicals are terephthalic acid radicals and 80 to 100, preferably 90 to 100 mole % of the diol radicals are ethyleneglycol and/or butanediol-1,4-radicals.

In addition to ethyleneglycol and butanediol-1,4-radicals, the preferred polyalkylene terephthalates can contain from 0 to 20 mole % of radicals of different aliphatic diols containing from 3 to 12 carbon atoms or cycloaliphatic diols containing from 6 to 12 carbon atoms, for example radicals of propanediol-1,3,2-ethylpropanediol-1,3, neopentylglycol, pentanediol-1,5, hexanediol-1,6, cyclohexandimethanol-1,4,3-methylpentanediol-1,3, and -1,6,2-ethylhexanediol-1,3, 2,2,-diethylpropanediol-1,3, hexanediol-2,5,1,4-di(β-hydroxyethoxy)-benzene, 2,2,-bis-4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates can be branched by incorporation of relatively small quantities of trihydric or tetrahydric alcohols or tribasic or tetrabasic carboxylic acids of the type described in DE-OS 1 900 270 and U.S. Pat. No. 3,692,744. Examples of preferred branching agents include trimesic acid, trimellitic acid, trimethylolethane and propane and pentaerythritol. It is advisable to use not more than 1 mole % of the branching agent, based on the acid component.

Polyalkylene terephthalates produced solely from terephthalic acid and the reactive derivatives thereof (for example the dialkyl esters thereof) and ethyleneglycol and/or butanediol-1,4 and mixtures of these polyalkylene terephthalates are particularly preferred.

Preferred polyalkylene terephthalates also include copolyesters produced from at least two of the above-mentioned alcohol components: poly-(ethyleneglycolbutanediol-1,4)-terephthalates are particularly preferred copolyesters.

The preferred polyalkylene terephthalates generally have an intrinsic viscosity of 0.4 to 1.5 dl/g, preferably 0.5 to 1.3 dl/g, in particular 0.6 to 1.2 dl/g measured in phenol/o-dichlorobenzene (1:1 parts by weight) at 25° C. in each case.

Suitable polyamides include known homopolyamides, copolyamides and mixtures of these polyamides. These can be partially crystalline and/or amorphous polyamides.

Polyamide-6, polyamide-6,6, mixtures and corresponding copolymers of these components are suitable as partially crystalline polyamides. Partially crystalline polyamides of which the acid component consists completely or partially of terephthalic acid and/or isophthalic acid and/or suberic acid and/or sebacic acid and/or azelaic acid and/or adipic acid and/or cyclohexane dicarboxylic acid, of which the diamine components consist completely or partially of m- and/or p-xylylenediamine and/or hexamethylenediamine and/or 2,2,4-trimethylhexamethylelendiamine and/or 2,2,4-trimethylhexamethylenediamine and/or isophoronediamine and of which the composition is basically known can also be used.

Polyamides which are produced completely or partially from lactams with 7 to 12 carbon atoms in the ring should also be mentioned, optionally while using one or more of the above-mentioned starting components.

Polyamide-6 and polyamide-6,6 and mixtures thereof are particularly preferred partially crystalline polyamides. Known products can be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5,-trimethylcyclohexylamine, 2,5- and/or 2,6-bis-(aminomethyl)-norbornane and/or 1,4- diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers obtained by polycondensation of several monomers are also suitable, moreover copolymers produced by addition of aminocarboxylic acids such as ε-aminocaproic acid, ω-aminoundecanic acid or ω-aminolauric acid or lactams thereof.

Particularly suitable amorphous polyamides include polyamides produced from isophthalic acid, hexamethylenediamine and other diamines such as 4,4'-diaminodicyclohexylmethane, isophoronediamine, 2,2,4- and/or 2,4,4-trimethylhexamtheylenediamine, 2,5- and/or 2,6-bis-(aminomethyl)-norbornene, or from isophthalic acid, 4,4'-diamino-dicyclohexylmethane and ε-caprolactam; or from isophthalic acid, 3,3'-dimethyl-4,4'-diaminodicyclohexylmethane and laurinlactam; or from terephthalic acid and the isomer mixture of 2,2,4- and/or 2,4,4-trimethylhexamethylenediamine.

Instead of pure 4,4'-diaminodicyclohexylmethane, it is also possible to use mixtures of the positional isomeric diaminodicyclohexylmethanes composed of 70 to 99 mole % of the 4,4'-diamino-isomer 1 to 30 mole % of the 2,4'-diamino-isomer 0 to 2 mole % of the 2,2'-diamino-isomer and optionally correspondingly more highly condensed diamines obtained by hydrogenation of industrial quality diaminodiphenylmethane. Up to 30% of the isophthalic acid can be replaced by terephthalic acid.

The polyamides preferably have a relative viscosity (measured on a 1 wt. % solution in m-cresol at 25° C.) of 2.0 to 5.0, particularly preferably 2.5 to 4.0.

If at least one polymer selected from the group comprising polycarbonates, polyesters, polyester carbonates and polyamides is additionally used, the quantity thereof is up to 500 parts by weight, preferably up to 400 parts by weight and particularly preferably up to 300 parts by weight (based on 100 parts by weight A+B in each case).

In the following examples, the parts mentioned are always parts by weight and the % mentioned always wt. % unless otherwise stated.

EXAMPLES

Example 1

According to the Invention 60 parts by weight (calculated as solid material) of a polybutadiene latex mixture (50% with an average particle diameter $d_{50}$ of 421 nm and a gel content of 85 wt. % and 50% with an average particle diameter $d_{50}$ of 276 nm and a gel content of 47 wt. %, both produced by radical polymerisation) are brought to a solids content of about 20 wt. % with water and are then heated to 63° C. Initially 0.045 parts by weight of sodium ascorbate (in the form of an aqueous solution) and then 0.135 parts by weight of tert.-butylhydroperoxide are subsequently added while stirring.

20 parts by weight of a monomer mixture consisting of 73 wt. % of styrene and 27 wt. % of acrylonitrile and 0.06 parts by weight of tert.-dodecylmercaptan are then added uniformly within 2 h.

0.25 parts by weight of potassium peroxodisulfate (dissolved in water) are then added and 20 parts by weight of a monomer mixture consisting of 73 wt. % of styrene and 27 wt. % of acrylonitrile and 0.06 parts by weight of tert.-dodecylmercaptan are then added uniformly within 2 h.

Simultaneously with the monomers, 1 part by weight (calculated as solid substance) of the sodium salt of a resinic acid mixture (Dresinate 731, Abieta Chemie GmbH, Gersthofen, dissolved in alkaline water) is added over 4 hours.

After a post-reaction time of 4 hours, the graft latex is coagulated, after addition of about 1 part by weight of a phenolic antioxidant, with a magnesium sulfate/acetic acid mixture, and the resultant powder dried under vacuum at 70° C. after washing with water. 40 parts by weight of this graft polymer are blended with 60 parts by weight of a styrene/acrylonitrile copolymer resin (72:28, $M_w \approx 15\,000$, $M_w/M_n - 1 \leq 2$), 2 parts by weight of ethylenediamine bisstearylamide and 0.1 part by weight of a silicone oil are blended in an internal kneader and subsequently processed into test pieces.

The Following Data Have Been Determined

Notched impact strength at room temperature ($a_k^{RT}$) and at −40° C. ($a_k^{-40°\,C.}$) according to ISO 180/1A (unit: $kJ/m^2$), ball indentation hardness ($H_c$) according to DIN 53 456 (unit: $N/mm^2$);

The thermoplastic flowability was assessed by measuring the necessary injection pressure at 240° C. (unit:bar) (see F. Johannaber, Kunststoffe 74 (1984), 1, pages 2 to 5);

The crude shade (colour in the undyed state) was assessed visually in the classifications ++ very light + light o medium − dark −− very dark The results are shown in Table 1.

Example 2

According to the Invention

Example 1 is repeated except that tert.-dodecylmercaptan is added in a quantity of 0.12 parts by weight together with the monomers after addition of potassium peroxodisulfate.

Example 3

Comparison

Example 1 is repeated except that 0.25 parts by weight of potassium peroxodisulfate (dissolved in water) are added after heating the rubber latex mixture rather than adding sodium ascorbate and tert.-butylhydroperoxide.

Example 4

Comparison

Example 1 is repeated except that 0.25 parts by weight of potassium peroxodisulfate (dissolved in water) are added instead of the addition of sodium ascorbate and tert.-butylhydroperoxide after heating the rubber latex mixture and 0.045 parts by weight of sodium ascorbate (aqueous solution) and 0.135 parts by weight of tert.-butylhydroperoxide are added instead of the addition of potassium peroxodisulfate, after adding monomers for two hours.

Example 5

According to the Invention 60 parts by weight (calculated as solid material) of an anionically emulsified polybutadiene latex produced by radical polymerisation with a particle diameter $d_{50}$ of 421 nm and gel content of 85 wt. % are adjusted to a solids content of about 20 wt. % with water and then heated to 63° C. The grafting reaction is then carried out in the manner described in Example 1.

Example 6
Comparison

Example 5 is repeated using the procedure described in Example 3.

Example 7
According to the Invention 50 parts by weight (calculated as solid material) of a rubber latex, obtained from a basic latex having an average particle diameter $d_{50}$ of 98 nm by chemical agglomeration, with an average particle diameter $d_{50}$ of 276 nm and a gel content of 93 wt. % are adjusted to a solids content of about 25 wt. % by addition of water and then heated to 58° C. Initially 0.2 parts by weight of dextrose and 0.004 parts by weight of iron(II) sulfate (in the form of an aqueous solution in each case) and then 0.125 parts by weight of cumene hydroperoxide (in the form of an aqueous emulsion) are subsequently added while stirring.

30 parts by weight of a monomer mixture of 70 wt. % of styrene and 30 wt. % of acrylonitrile and 0.27 parts by weight of tert.-dodecylmercaptan are then added uniformly within 1.5 h.

0.25 parts by weight of potassium peroxodisulfate (dissolved in water) are then added and 20 parts by weight of a monomer mixture of 70 wt. % of styrene and 30 wt. % of acrylonitrile and 0.28 parts by weight of tert.-dodecylmercaptan are then added uniformly within 1.5 h.

After a post-reaction time of 3 hours, the graft latex is coagulated with a magnesium sulfate solution after addition of about 1.5 parts by weight of an antioxidant and the resultant powder dried under vacuum at 70° C. after washing with water.

40 parts by weight of the graft polymer are blended with 60 parts by weight of a styrene/acrylonitrile copolymer resin (72:28, $\overline{M}_w \approx 138\,000$), 1 part by weight of pentaerythritol tetrastearate and 0.15 parts by weight of a silicone oil are blended in an internal kneader and are then processed into test pieces.

Example 8
Comparison

Example 7 is repeated using a procedure similar to that in Example 3.

It can be seen from the test values compiled in Table 1 that only the moulding compositions according to the invention exhibit an increase in viscosity without adversely affecting rigidity and processibility.

Very good crude shade values are also achieved.

TABLE 1

Test data of investigated moulding compositions

| Example | $a_k^{RT}$ (kJ/m²) | $a_k^{-40°\,C.}$ (kJ/m²) | $H_c$ (N/mm²) | Ignition pressure (bar) | Crude shade |
|---|---|---|---|---|---|
| 1 | 44 | 30 | 82 | 174 | + |
| 2 | 46 | 30 | 83 | 166 | ++ |
| 3 (comparison) | 38 | 26 | 82 | 159 | − |
| 4 (comparison) | 38 | 28 | 81 | 170 | ○ |
| 5 | 48 | 30 | 82 | 175 | ++ |
| 6 (comparison) | 43 | 26 | 83 | 168 | − |
| 7 | 36 | 14 | 93 | 210 | + |
| 8 (comparison) | 28 | 10 | 93 | 205 | − |

What is claimed is:

1. A thermoplastic ABS moulding composition comprising:
   A) at least one elastic/thermoplastic graft polymer prepared by radical emulsion polymerisation of resin-forming vinyl monomers in the presence of rubber existing in latex form with a glass transition temperature $\leq 0°$ C. using an initiator combination consisting of a redox initiator system and a persulfate compound; and
   B) at least one copolymer composed of styrene and acrylonitrile and optionally further comonomers,
   wherein graft polymer A) is produced by the steps of,
   (i) supplying a portion of the vinyl monomers to the rubber latex,
   (ii) adding the redox initiator components at the beginning of the graft polymerisation reaction in quantities of 0.1 to 2.5 wt. % (based on the monomers added up to the moment of addition of persulfate compound in each case),
   (iii) adding said persulfate compound after an addition of monomers of 10 to 95 wt. % (based on total quantity of monomer in each case), in quantities of 0.05 to 1.5 wt. % (based on the monomers added from the moment of addition of persulfate compound in each case), and
   (iv) allowing polymerisation to proceed to completion,
   further wherein the rubber existing in latex form of graft polymer A) is a mixture of at least two rubber latices having,
   a) an average particle diameter $d_{50} \leq 320$ nm and a gel content $\leq 70$ wt. %, and
   b) an average particle diameter $d_{50} \geq 370$ nm, and a gel content $\geq 70$ wt. %.

2. The thermoplastic moulding composition of claim 1 wherein graft polymer A) is present in quantities of 10 to 80 wt. %.

3. The thermoplastic moulding composition of claim 1 wherein the elastic/thermoplastic graft polymer A) has a rubber content of 20to 80 wt. %.

4. The thermoplastic moulding composition of claim 1 wherein styrene and acrylonitrile are used as resin-forming monomers during the production of graft polymer A).

5. The thermoplastic moulding composition of claim 1 wherein the redox initiator system for producing graft polymer A) comprises (i') an oxidixing component selected from at least one of cumene hydroperoxide and tert.-butylhydroperoxide, and (ii') a reducing component selected from at least one of dextrose, ascorbic acid, ascorbic acid salt and sodium formaldehyde sulfoxylate.

6. The thermoplastic moulding composition of claim 1 wherein potassium peroxodisulfate is used as persulfate compound for producing graft polymer A).

7. The thermoplastic moulding composition of claim 1 wherein copolymer B) is made up of monomers selected from styrene, α-methyl styrene, acrylonitrile, methyl methacrylate, maleic anhydride, N-phenylmaleimide and mixtures thereof.

8. The thermoplastic moulding composition of claim 1, additionally comprising at least one resin selected from the group consisting of polycarbonates, polyester carbonates, polyesters and polyamides.

9. A molded article comprising the composition of claim 1.

10. The moulding composition of claim 1 wherein during the production of graft polymer A), polymerisation takes place before addition of the persulfate compound in the absence of molecular weight regulator, and polymerisation takes place after addition of the persulfate compound in the presence of molecular weight regulator.

11. A process for producing rubber-containing graft polymers by emulsion polymerisation using a combination of initiators consisting of a redox initiator system and a persulfate compound, said process comprising the steps of:

i) adding graft monomers to a rubber latex, ii) adding redox initiator components in quantities of 0.1 to 2.5 wt. % (based on the monomers added up to the moment of addition of persulfate compound) at the beginning of the graft polymerisation reaction, iii) adding said persulfate compound in quantities of 0.05 to 1.5 wt. % (based on the monomers added from the moment of addition of the persulfate compound) after a monomer addition of 10 to 95 wt. % (based on total quantity of monomers); and iv) allowing the polymerisation reaction to proceed to completion, wherein said rubber latex of step i) is a mixture of at least two rubber latices having, a) an average particle diameter $d_{50} \leq 320$ nm and a gel content $\leq 70$ wt. %, and b) an average particle diameter $d_{50} \geq 370$ nm, and a gel content $\geq 70$ wt. %.

12. The process of claim 11 wherein during said process, polymerisation takes place before addition of the persulfate compound in the absence of molecular weight regulator, and polymerisation takes place after addition of the persulfate compound in the presence of molecular weight regulator.

13. A thermoplastic ABS moulding composition containing:

A) at least one elastic/thermoplastic graft polymer prepared by radical emulsion polymerisation of resin-forming vinyl monomers in the presence of rubber existing in latex form with a glass transition temperature $\leq 0°$ C. using an initiator combination consisting of a redox initiator system and a persulfate compound; and B) at least one copolymer composed of styrene and acrylonitrile and optionally further comonomers, wherein graft polymer A) is produced by the steps of, (i) supplying a portion of the vinyl monomers to the rubber latex, (ii) adding the redox initiator components at the beginning of the graft polymerisation reaction in quantities of 0.1 to 2.5 wt. % (based on the monomers added up to the moment of addition of persulfate compound in each case), (iii) adding a persulfate compound after an addition of monomers of 10 to 95 wt. % (based on total quantity of monomer in each case), in quantities of 0.05 to 1.5 wt. % (based on the monomers added from the moment of addition of persulfate compound in each case), and (iv) allowing polymerisation to proceed to completion, further wherein during the production of graft polymer A), polymerisation takes place before addition of the persulfate compound in the absence of molecular weight regulator, and polymerisation takes place after addition of the persulfate compound in the presence of molecular weight regulator.

14. A process for producing rubber-containing graft polymers by emulsion polymerisation using a combination of initiators consisting of a redox initiator system and a persulfate compound, said process comprising the steps of:

i) adding graft monomers to a rubber latex, ii) adding redox initiator components in quantities of 0.1 to 2.5 wt. % (based on the monomers added up to the moment of addition of persulfate compound) at the beginning of the graft polymerisation reaction, iii) adding said persulfate compound in quantities of 0.05 to 1.5 wt. % (based on the monomers added from the moment of addition of the persulfate compound) after a monomer addition of 10 to 95 wt. % (based on total quantity of monomers); and iv) allowing the polymerisation reaction to proceed to completion, wherein during said process, polymerisation takes place before addition of the persulfate compound in the absence of molecular weight regulator, and polymerisation takes place after addition of the persulfate compound in the presence of molecular weight regulator.

* * * * *